United States Patent Office 3,479,350
Patented Nov. 18, 1969

3,479,350
PROCESS FOR THE MANUFACTURE OF
DERIVATIVES OF CEPHALOSPORIN C
Stephen Eardley, Ruislip, and Gordon Ian Gregory, Chalfont St. Peter, England, John Kevin Lazenby, Grangemouth, Scotland, and Alan Gibson Long, Greenford, England, assignors to Glaxo Laboratories Limited, Greenford, England, a British company
No Drawing. Continuation of application Ser. No. 435,331, Feb. 25, 1965. This application Dec. 5, 1966, Ser. No. 599,323
Int. Cl. C07c 99/24; A61k 21/00
U.S. Cl. 260—243
10 Claims

ABSTRACT OF THE DISCLOSURE

A process for the preparation of a compound of the formula

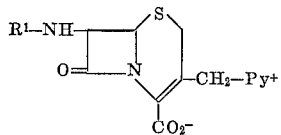

(IV)

in which $R^1$ is thienylacetyl or phenylacetyl and Py is pyridine or a substituted pyridine which includes the step of reacting a compound of the formula

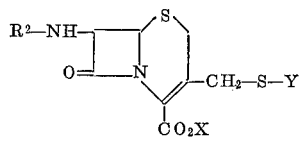

(V)

in which $R^2$ is hydrogen, thienylacetyl or phenylacetyl, the moiety —S—Y is the residue of a nucleophile Y—S—H and X is cation, with a compound Py at least partially dissolved in a halogenated hydrocarbon or a cyclic ether in the presence of a dissolved salt of mercury, silver or gold.

---

This application is a continuation of abandoned application Ser. No. 435,331, filed Feb. 25, 1965.

This invention is concerned with a process for the manufacture of derivatives of the antibiotic cephalosporin C which has the structure:

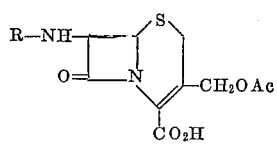

(I)

where R is the group $HOOC.CH(NH_2)(CH_2)_3CO$—i.e. the α-amino-adipoyl group.

Cephalosporin C has been converted into 7-aminocephalosporanic acid (7-ACA) and the resultant amine has been acylated with various acylating agents to form 7-acylamido analogues of cephalosporin C of improved or modified activity. For example, 7-phenylacetamidocephalosporanic acid (7-PAC), obtained by reaction of 7-ACA with a phenylacetyl halide, possesses much greater activity against certain organisms than does cephalosporin C. One may thus prepare compounds of Formula I wherein R is an acyl group other than α-aminoadipoyl. The activity of compounds of Formula I, wherein R is an acyl group, α-aminoadipoyl or otherwise, can further be modified by reaction with a nucleophile which replaces the acetate group on the exocyclic methylene. Compounds of this type may be shown as having the formula:

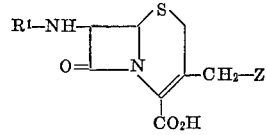

(II)

wherein $R^1$ is an acyl group and Z is the residue of the nucleophile.

For example, Z may be the pyridinium group and $R^1$ phenylacetyl, viz, the compound of the formula:

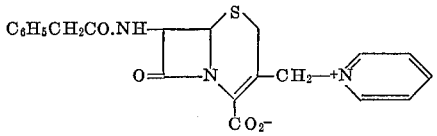

(III)

this compound being obtained, for example, by reaction of pyridine with 7–PAC in an aqueous medium.

Z may also be the residue of a nucleophile as described in U.S. application Ser. No. 193,015 of J. S. G. Cox et al. filed May 7, 1962, where the use of various nucleophiles having sulphur-containing groups for reaction with cephalosporins is described and claimed.

Compounds of Formula II where Z is pyridinium or substituted-pyridinium possess interesting antibiotic activity but existing methods for their preparation only lead to low yields of the desired end-product. Thus, in our hands, the reaction of 7–PAC with pyridine in aqueous media according to the method of Hale, Newton Abraham, Biochem. J., 1961, 79, 403 has led to yields of only about 22%.

On the other hand, reaction of 7-acylamidocephalosporanic acids with sulphur-containing nucleophiles may lead to higher yields but the resultant compounds may possess the disadvantage of low solubility in water which decreases their utility as antibiotics for practical purposes. Attempts to replace the sulphur-containing nucleophilic residue in these compounds with a pyridine-type nucleophile have met with little success.

In U.S. application Ser. No. 381,580 of B. R. Cowley et al. filed July 9, 1964 and now U.S. Patent 3,261,832 a process is described for the preparation of derivatives of cephalosporin of the general formula:

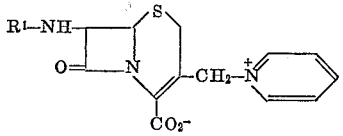

(IV)

in which formula $R^1$ is an acyl group, or of analogous derivatives wherein the pyridine nucleus is substituted by one or more atoms or groups, which comprises reacting a sulphur compound of the general formula:

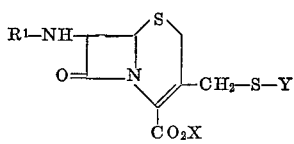

(V)

in which formula $R^1$ has the meaning defined above; the moiety —S—Y is the residue of a nucleophile, and X is a cation, with pyridine or a nuclear substituted pyridine (the "pyridine reagent") in a reaction medium contaning dissolved therein a salt of mercury, silver or gold, said salt being able to complex with the moiety —S—Y and to ionize in water.

X may be hydrogen, an alkali metal, ammonium or quarternary ammonium.

We have now found that this replacement can be effected in organic solvent media in place of the aqueous media which are described in U.S. application Ser. No. 381,580, this finding being quite surprising having regard to the nature of the reactants.

If desired, $R^1$ may also be a hydrogen atom in which event the resulting compound of Formula V should be acylated to obtain the desired antibiotic.

SULPHUR COMPOUNDS

The compound of Formula V may be obtained by reaction of a compound of the formula:

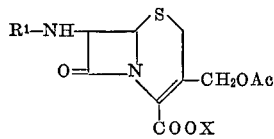

where $R^1$ and X have the meanings defined above, with a sulphur containing nucleophile (YSH or a salt thereof) or from an appropriately substituted cephalosporin precursor e.g. using the method of Belgian Patent No. 621,452. Sulphur-containing nucleophiles which may be used include those disclosed in U.S. application Ser. No. 193,015 i.e. of J. S. G. Cox et al. filed May 7, 1962 and now Patent No. 3,278,531, thiosulphates, thiols, thioureas, thioamides or thiophenols. Of these, we have obtained good results using 2-mercaptopyrimidines e.g. 2-mercapto-4-methylpyrimidine and alkali metal thiosulphates. We may also use the dithiocarbamates disclosed in U.S. application Ser. No. 309,331 of J. D. Cocker, filed Sept. 16, 1963 and now Patent No. 3,258,461, or compounds of the formula $R^3.CZ.SH$ or $R^3.SO_2SH$, Z being sulphur or oxygen and $R^3$ being an aliphatic, aryl, araliphatic, heterocyclic or heterocyclic substituted aliphatic group or soluble salts thereof. Alternatively one may use compounds of the formula Alk O.CSSH or soluble salts thereof, Alk being an alkyl group.

We have obtained particularly good results with nucleophiles of the latter type and especially with thiobenzoic acid and its alkali metal salts e.g. sodium thiobenzoate; compounds of the formula:

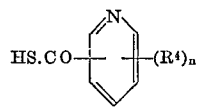

where the HS.CO— is attached $\alpha$, $\beta$ or $\gamma$, preferably $\alpha$ or $\gamma$; $R^4$ is a $C_1$–$C_4$ alkyl group or a fused benzene ring and $n$ is 0, 1 or 2 and alkali metal salts thereof e.g. thiopicolinic acid and sodium thiopicolinate; and compounds of the formula:

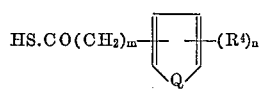

where $m$ is 0 or 1 and Q is oxygen, sulphur, NH or N-alkyl ($C_1$–$C_4$) and $R_4$ $n$ have the meanings defined above, and alkali metal salts thereof e.g. 2-thiolcarboxymethylthiophene and its sodium salts. Where Q=NH it may be necessary to protect the hydrogen atom during preparation of the thio acid. In our hands these nucleophiles have led to high yields of compounds of Formula V.

Compounds of Formula V may be prepared by the general methods described in U.S. applications Ser. Nos. 193,015 and 309,331.

ACYL GROUPS

Whilst $R^1$ may represent an acyl group in general terms one may use specific acyl derivatives representative of alkanoyl, alkenoyl, substituted alkanoyl e.g. aralkanoyl, aryloxyalkanoyl, S-arylthioalkanoyl and S-aralkylthio-alkanoyl etc. These acyl derivatives include those having the general formulae:

(i) $R'(CH_2)_nCO$— where $R'$ is phenyl, cycloalkyl, substituted phenyl, substituted cycloalkyl or O, N or S groups, particularly 5- or 6-membered monocyclic heterocyclic, and $n$ is an integer from 1–4. Examples of this group include phenylacetyl, nitrophenyl acetyl, phenylpropionyl, cyclopentylacetyl, thienyl-2-acetyl, thienyl-3-acetyl and cyclohexylacetyl and those in U.S. applications Ser. Nos. 354,112 of S. Eardley et al. and 354,127 of S. Eardley et al. both filed Mar. 23, 1964.

(ii) $C_nH_{2n+1}CO$— where $n$ is an integer from 2–7. The alkyl group may be straight of branched and, if desired, may be interrupted by an oxygen or a sulphur atom or substiuted by one or more halogen atoms. Examples of such groups include hexanoyl, heptanoyl, octanoyl and butylthioacetyl.

(iii) $C_nH_{2n-1}CO$— where $n$ is an integer from 2–7. The alkenyl group may be straight or branched and, if desired, may be interrupted by an oxygen or a sulphur atom. Examples of such groups include acrylyl, crotonyl and allylthioacetyl.

(iv) $R'O\ CR''R'''.CO$— where $R'$ has the meaning defined under (i) or is an alkyl group and $R''$ and $R'''$ are the same or are different and each is a hydrogen atom or an alkyl, aryl or heterocyclic group. An example of such a group is phenoxyacetyl.

(v) $R'SCR''R'''.CO$— where $R'$, $R''$ and $R'''$ are as defined above. Examples of such thio groups include S-phenylthioacetyl, S-chlorophenylthioacetyl and S-bromophenylthioacetyl.

(vi) $R'(CH_2)_mS(CH_2)_nCR''R'''.CO$— where $R'$, $R''$ and $R'''$ are as defined above, $m$ is an integer from 1–4 and $n$ is 0 or an integer from 1–4. Examples of such a group include S-benzylthioacetyl, benzylthiopropionyl and $\beta$-phenethylthioacetyl.

(vii) $R'CO$— where $R'$ has the meaning defined above. Examples of such groups include benzoyl, substituted benzoyl and cyclopentanoyl.

In general, we prefer that $R^1$ should be selected from acyl groups of section (i).

It should be noted that, if desired, $R^1$ may be $\alpha$-aminoadipoyl i.e. the acyl group of cephalosporin C or any other acyl group containing an amino group e.g. those disclosed in U.S. application Ser. No. 293,581 of W. F. Wall et al. filed July 5, 1964, abandoned in favor of a continuing application Ser. No. 596,004, filed Nov. 21, 1966, which was in turn abandoned in favor of a continuing application Ser. No. 660,141, filed Aug. 11, 1967, which issued as Patent No. 3,422,103.

PYRIDINE REAGENTS

In the process according to the invention one may use nuclear-substituted pyridines in place of pyridine and examples of such substituted pyridines include $\alpha$-, $\beta$- and $\gamma$-picoline, lutidines, nicotinamide, isonicotinamide, nicotinic acid and isonicotinic acid and their esters. The pyridine reagent should preferably not contain sulphur. If the group $R^1$ contains a sulphur or halogen atom group the pyridine reagent may also attack the group $R^1$.

The precise nature of the pyridine reagent will depend on the nature of the end-product and its attendant antibacterial properties. For example, the pyridine reagent may be pyridine itself or one having the formula:

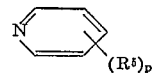

where $R^5$ is a loweralkyl, carbamoyl, N-monoloweralkylcarbamoyl, N,N-diloweralkyl carbamoyl, loweralkoxycarbonyl, hydroxylower alkyl, N-(hydroxylower alkyl)-carbamoyl or carbamoylloweralkyl group and $p$ is 1, 2 or 3. The terms "lower alkyl" and "loweralkoxy" indicate groups containing 1–6, preferably 1–2, carbon atoms. The pyridine molecule may be substituted with two or more different species of the group $R^5$.

METAL SALTS

One may use salts of silver, mercury or gold. We particularly prefer to use mercuric ($Hg^{++}$) salts. The efficacy of the reaction is also dependent on other factors including the nature of the anion of the salt, the type of cations which it produces in aqueous solution and the solubility of the salt in water.

The metal salt is advantageously one of the formula $HgD_2$ or $HgD$ which furnishes $Hg^{++}$ and/or $HgD^+$ cations, preferably the former, in aqueous solution, $D^-$ being a weakly nucleophilic anion; a like-acting salt $Hg_nE_2$ of mercury with a di- or polyvalent anion where E is an $n$-valent anion, $n$ being 2 or greater, or a salt of the formula $Ag_mF$ where F is an $m$-valent anion of a weakly nucleophilic nature and $m$ is 1 or greater.

The anion of the salt should be substantially non-oxidizing to compound (V) and especially to the moiety —S—Y under the conditions of the reaction and should preferably be an anion of a strong acid, i.e. an acid having a pKa value in aqueous solution of less than 2, to facilitate formation of the desired cations.

Nucleophilic properties in the anion may compete with those in the chosen nucleophile; therefore it is desirable that the anion have a nucleophilic constant less than that of the acetate ion for conventional one-step nucleophilic displacement in aqueous media at a tetrohedral carbon centre (see, for example, Hine's "Physical Organic Chemistry" McGraw-Hill, 1962, pp. 159–161). Mercuric salts with anions of nucleophilic constant less than acetate generally promote fast reactions of the required type. Solubility of the salt in water is also an important factor: mercuric sulphate gives anions in water with a nucleophilic constant slightly less than that of acetate, but is less soluble in water than mercuric acetate, and has been found by us to be inferior as a promoter in the displacement of the thiobenzoyl moiety. Mercuric and silver salts with the attributes described above include the perchlorate, nitrate, trifluoroacetate and tetrafluoroborate. Mercurous perchlorate also possesses the desired properties.

The metal salt should be used in an amount at least equivalent to the compound of Formula V, and is desirably used in several fold excess e.g. 2–5 equivalents.

Instead of using the metal salt and compound of Formula V one may use a salt of an appropriate metal with the compound of Formula V, e.g. the silver salt, and this may be preformed or formed in situ in the reaction mixture.

Since the pyridine reagents react with the metal salts to form well defined complexes these complexes may be used in place of the simple metal salts. For example, pyridine and mercuric perchlorate react in water to form a compound probably having the structure:

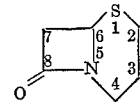

The use of such complexes may be advantageous in the process of the invention in place of simple metal salts, especially if the latter are apt to decompose in the aqueous media of application Ser. No. 381,580 since this enables one to control the metal ion concentration more accurately.

REACTION CONDITIONS

In view of the fact that the mercury, silver or gold salts are necessary for the success of the reaction and also because these salts appear to function ionically, it is surprising to find that the reaction can be effected in substantially non-aqueous organic media, regardless of the degree of polarity of the latter, the reagents being generally otherwise as described above. The reaction may be effected at any temperature up to the boiling point of the reaction mixture consistent with the stability of the reagents. In general we prefer to operate at temperatures of 20° to 100° C. e.g. at above 50° C. The course of the reaction may be followed electrophoretically as described in U.S. application Ser. No. 381,580.

Media which may be used include halogenated hydrocarbons e.g. methylene chloride, carbon tetrachloride, chloroform, ethylene dichloride or perchloroethylene; and cyclic ethers e.g. dioxan or tetrahydrofuran.

The reaction medium need not be liquid at room temperature. Solids, may be used so long as they are liquid at the reaction temperature.

Complexes of pyridine reagents and metal salts may be used with advantage in non-aqueous media due to their generally improved solubility therein.

In practice the compound (V) may be dissolved or suspended in the chosen medium containing pyridine reagent, preferably in excess for the reaction: a 1:1-mixture of pyridine reagent and the chosen medium is generally satisfactory. A salt (e.g. mercuric perchlorate) is added; two molecular equivalents to one of the compound (II) is satisfactory and it is generally advisable to keep this ratio below 6:1. The reaction may be carried out at about 50°.

With the 2:1-ratio mentioned above, most of the mercury is precipitated, and further steps (e.g. passage of hydrogen sulphide) for its removal may be avoided. The pyridinium derivative may be extracted in a fairly pure state with water and excess pyridine reagent is removed by re-extraction, e.g. with methylene dichloride. Ionic impurities may be removed from the aqueous phase with suitable exchangers; evaporation then leaves the betaine as a residue or it may be precipitated as a salt by the addition of an acid, preferably an acid having a pKa in water of 4 or less e.g. nitric or perchloric acid, as described in application Ser. No. 408,757 of S. Eardley et al. filed Nov. 4, 1964, and now Patent No. 3,280,118.

In order that the invention may be well understood the following examples are given by way of illustration only. In the examples the compounds are named by reference to the substance cepham, viz:

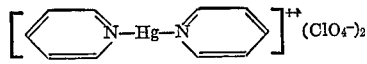

Example 1

(a) Conversion of 3-benzoylthiomethyl-7-(2'-thienylacetamido)-ceph-3-em-4-oic acid into N-(7-2'-thienylacetamidoceph - 3 - em - 3 - ylmethyl)-pyridinium-4-carboxylate using mercuric nitrate in anhydrous media.— The following results were obtained by dissolving the thiobenzoate (0.237 g., 0.5 mmole) in pyridine (2.5 ml.) and adding a mixture of anhydrous mercuric nitrate (0.406 g., 1.25 mmole) dried several days over $P_2O_5$ in vacuo, in the second solvent (2.5 ml.). The mixture were heated at 50° for 5 hr., aliquots were removed at suitable intervals and assayed by electrophoresis, with elution of the spot corresponding to the pyridinium compound and measurement of its ultraviolet absorption at 240 and 255 m$\mu$. The following results represent the time taken to achieve the highest assay and the yield of the pyridinium compound at that time for mixtures of pyridine with each of the solvents named:

| Solvent | Time for max. assay | Yield, percent |
| --- | --- | --- |
| Dioxan | 3.0 hr | 7 |
| Methylene dichloride* † | | 6 |

\* The electrophilic agent was silver nitrate.
† The solution was pyridine:methylene dichloride=2:98 (by volume)

Test-tube experiments with electrophoretic evaluation have shown that the pyridinium derivative is formed from the 4-methyl-2-mercaptopyrimidine derivative when the following solvents are mixed with pyridine in equal volumes, and mercuric nitrate is used as the electrophilic promoter. In each case the pyridinium derivative was recognised by the absorptivity ratio (aqueous solutions):

$$\frac{\text{optical density at 238 m}\mu}{\text{optical density at 255 m}\mu} = 1.1$$

(1) Methylene chloride.
(2) Dioxan.

Mobilities of the reaction products at pH 1.9 were compared with standard reference samples of the pyridinium derivative, detection being carried out under an ultra-violet lamp and by spraying with a potassium iodoplatinate reagent.

With dioxan as solvent, N-7-(2'-thienylacetamidoceph-3-em-3-ylmethyl)-pyridinum-4-carboxylate was prepared from 2-(4'-carboxy-7'-2''-thienylacetamidoceph-3'-em-3'-ylmethylthio)-4-methyl-pyrimidine in experiments employing mercuric acetate and mercuric nitrate, respectively.

To a swirled solution of 2-(4'-carboxy-7'-2''-thienyl-acetamidoceph-3'-em-3'-ylmethylthio) - 4 - methylpyrimidine (4.6 g., 10 mmole) in pyridine (50 ml.) was added a solution of the mercuric salt (20 mmole) in dioxan (50 ml.). The mixture was swirled at 50° for 20 min. and was then evaporated to dryness in a rotary evaporator at <40° over 35 min. The residue was suspended in water (100 ml.) and a stream of hydrogen sulphide passed through the suspension for 15 min. Any excess of hydrogen sulphide was removed by flushing with nitrogen for 20 min. before the precipitated mercuric sulphide was removed by filtration through Kieselguhr. The filtrate was then passed down a column (3 cm. diameter) containing sections of Zeo-Karb 226 in the hydrogen cycle (20 ml.), De-acidite FF in the acetate cycle (60 ml.), Zeo-Karb 226 in the hydrogen cycle (20 ml.), and Dowex–1 in the acetate cycle (60 ml.). Elution of the column was continued using washings from the Kieselguhr pad, until 1.5 l. had been collected; the eluates were then combined and freeze-dried. The freeze-dried solid was suspended in water (ca. 15 ml.) and the suspension (at pH 3.5), was adjusted to pH 4.5 by addition of ammonia. After filtration, to remove a small quantity of insoluble material, the filtrate was adjusted to pH 1.2 by addition of nitric acid. The nitrate salt of the pyridinium derivative separated as a pale yellow crystalline solid $\lambda_{max}$ 237–239 m$\mu$ ($E_{1\ cm.}^{1\%}$ 314), $\lambda$ (inflexion) 255 m$\mu$ ($E_{1\ cm.}^{1\%}$ 286)

$[\alpha]_D$ +43° (C, 1.1 in pH 7-phosphate buffer).

The results obtained were as follows:

| | Solvent [1] | Maxm. Yield, percent | Time[2], mins. |
|---|---|---|---|
| Mercuric Salt: | | | |
| Acetate | Dioxan | 12 | >150 [3] |
| Nitrate | do | 55 | >180 [3] |

[1] 50% of solvent specified with pyridine.
[2] Time (approx.) to maximum yield.
[3] Optimum yield not attained within time of reaction.

What is claimed is:

1. In a process for the preparation of a compound of the formula:

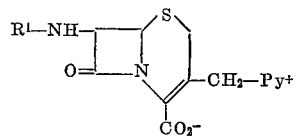

(IV)

in which $R^1$ is a carboxylic acyl group selected from the group consisting of thienylacetyl and phenylacetyl and Py is a group

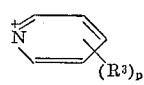

wherein $R^3$ is selected from the group consisting of lower alkyl, carbamoyl, N-monoloweralkyl carbamoyl, N,N-diloweralkyl carbamoyl, loweralkoxycarbonyl, hydroxy loweralkyl, N-(hydroxy lower alkyl)- carbamoyl and carbamoyl lower alkyl and $p$ is 0, 1, 2 or 3, the step which comprises reacting a compound of the formula

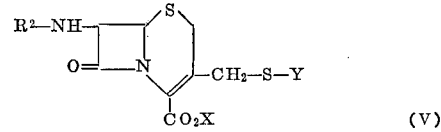

(V)

in which $R^2$ is selected from the group consisting of thienylacetyl and phenylacetyl groups and hydrogen; the moiety —S—Y is the residue of a nucleophile selected from the group consisting of (a) an alkali metal thiosulphate;
(b) a thiol of the formula

H—S—R⁴ in which $R^4$ is selected from the group consisting of aminoalkyl containing 2 to 5 carbon atoms, 2-thiazolinyl, 2-hydantoinyl, 2-imidazolyl, 2-benzimidazolyl, 2-benzothiazolyl, 2-benzoxazolyl, 2-pyridinyl, 5-thiadiazolyl, 2-pyrimidinyl, 2-piperidinyl and amino and alkyl nuclear derivatives of the heterocyclic radicals;

(c) a thiourea of the formula

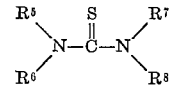

in which $R^5$, $R^6$, $R^7$ and $R^8$ are selected from the group consisting of hydrogen, alkyl, cycloalkyl, alkenyl, aryl, aralkyl and alkylene represented by $R^6$ and $R^8$ taken together;

(d) a thioamide of the formula

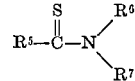

in which $R^5$, $R^6$ and $R^7$ have the above given meanings;

(e) a thiophenol of the formula

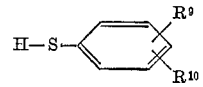

in which $R^9$ and $R^{10}$ are selected from the group consisting of hydrogen, amino, alkylamino, dialkylamino, nitro, nitroso, carboxyl, cyano and trifluoromethyl;

(f) a dithiocarbamate of the formula

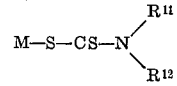

in which M is selected from the group consisting of alkali metal and ammonium and $R^{11}$ and $R^{12}$ are selected from the group consisting of alkyl of from 1 to 6 carbon atoms and alkylene represented by $R^{11}$ and $R^{12}$ taken together;

(g) a compound of the formula

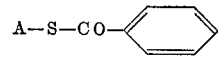

in which A is selected from the group consisting of hydrogen- and alkali metal;

(h) a compound of the formula

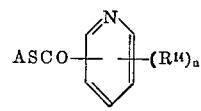

in which A has the above given meaning, $R^{14}$ is alkyl of from 1 to 4 carbon atoms and $n$ is 0, 1 or 2; and
(i) a compound of the formula

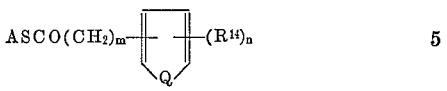

in which Q is selected from the group consisting of oxygen, sulphur, NH and N-alkyl of from 1 to 4 carbon atoms, $m$ is 0 or 1 and A, $R^{14}$ and $n$ have the above given meanings and X is a cation selected from the group consisting of hydrogen, alkali metal, ammonium and quaternary ammonium, with a compound Py at least partly dissolved in an inert organic solvent selected from the group consisting of methylene chloride, carbon tetrachloride, chloroform, ethylene dichloride, perchloroethylene, dioxan and tetrahydrofuran in the presence of a dissolved salt of a metal selected from the group consisting of mercury, silver and gold, said salt being able to complex with the moiety —S—Y and to ionize in water and having an anion substantially non-oxidizing to said moiety —S—Y and a nucleophilic constant less than that of the acetate ion for one-step nucleophilic displacement in aqueous media at a tetrahedral carbon center.

2. A process as defined in claim 1 in which the group $R^1$ is a 2-thienylacetyl group.

3. A process as defined in claim 1 in which said salt is a mercuric salt.

4. A process as defined in claim 1 in which the compound Py is pyridine.

5. A process as claimed in claim 1 in which the compound of Formula V has the structure

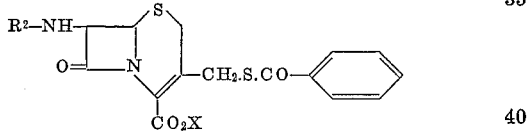

where $R^2$ and X have the meanings defined in claim 1.

6. A process as defined in claim 1 in which the compound of Formula V has the formula:

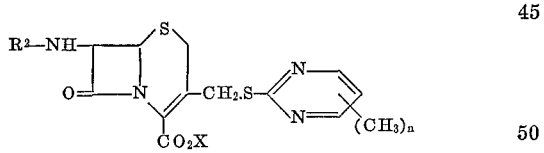

where $R^2$ and X have the meanings defined in claim 1 and $n$ is at least 1 and not greater than 2.

7. A process as defined in claim 1 in which the compound of Formula V has the formula:

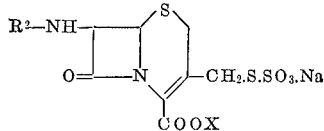

where $R^2$ and X have the meanings defined in claim 1.

8. A process as defined in claim 1 in which the compound of Formula V has the formula:

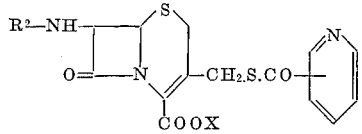

where $R^2$ and X have the meanings defined in claim 1.

9. A process as defined in claim 1 in which the compound of Formula V has the formula:

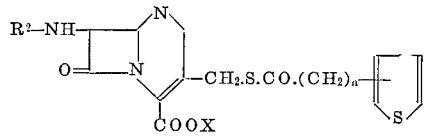

where $n$ is not greater than 1 and where $R^2$ and X have the meanings defined in claim 1.

10. A process as defined in claim 1 in which the compound of Formula V has the formula:

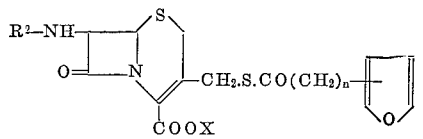

where $n$ is not greater than 1 and where $R^2$ and X have the meanings defined in claim 1.

References Cited

UNITED STATES PATENTS 3,261,832   6/1966   Cowley et al.

NICHOLAS S. RIZZO, Primary Examiner